(12) United States Patent
Kumar et al.

(10) Patent No.: US 9,167,951 B2
(45) Date of Patent: Oct. 27, 2015

(54) DISHWASHER APPLIANCE HAVING ENERGY RECOVERY FEATURES

(71) Applicant: General Electric Company, Schenectady, NY (US)

(72) Inventors: Shree Kumar, Bangalore (IN); Ronald Scott Tarr, Louisville, KY (US)

(73) Assignee: General Electric Company, Schenectady, NY (US)

(*) Notice: Subject to any disclaimer, the term of this patent is extended or adjusted under 35 U.S.C. 154(b) by 83 days.

(21) Appl. No.: 14/169,244

(22) Filed: Jan. 31, 2014

(65) Prior Publication Data

US 2015/0216390 A1    Aug. 6, 2015

(51) Int. Cl.
*A47L 15/42* (2006.01)
(52) U.S. Cl.
CPC ......... *A47L 15/4291* (2013.01); *A47L 15/4225* (2013.01); *A47L 15/4285* (2013.01)
(58) Field of Classification Search
CPC .................................................. A47L 15/4291
See application file for complete search history.

(56) References Cited

U.S. PATENT DOCUMENTS 4,703,629 A    11/1987   Moore
8,398,784 B2    3/2013   Jerg et al.

FOREIGN PATENT DOCUMENTS

| EP | 0358279 A | 3/1990 |
| EP | 2301409 A | 3/2011 |
| EP | 2556785 A | 2/2013 |
| EP | 2286708 B | 8/2013 |
| WO | WO 2012/062663 A1 | 5/2012 |

*Primary Examiner* — Jason Ko
(74) *Attorney, Agent, or Firm* — Dority & Manning, P.A.

(57) ABSTRACT

Dishwasher appliances are provided. A dishwasher appliance includes a tub defining a chamber for the receipt of articles for cleaning, a sump for collecting liquid from the chamber, a fluid circulation conduit for circulating liquid in the tub, and a first pump downstream of and in fluid communication with the sump. The dishwasher appliance further includes an adsorption assembly, the adsorption assembly including a desiccant module and an adsorption conduit extending through the desiccant module. The dishwasher appliance further includes a second pump downstream of and in fluid communication with the adsorption conduit, the second pump further upstream of the sump. The dishwasher appliance further includes a first heater spaced from the adsorption assembly, the first heater operable to heat liquid flowed therethrough from the first pump.

16 Claims, 5 Drawing Sheets

DISHWASHER APPLIANCE HAVING ENERGY RECOVERY FEATURES

FIELD OF THE INVENTION

The present disclosure relates generally to dishwasher appliances, and more particularly to dishwasher appliances which utilize desiccants to recover energy during operation.

BACKGROUND OF THE INVENTION

Modern dishwashers typically include a wash chamber where e.g., detergent, water, and heat can be applied to clean food or other materials from dishes and other articles being washed. Various cycles may be included as part of the overall cleaning process. For example, a typical, user-selected cleaning option may include a wash cycle and rinse cycle (referred to collectively as a wet cycle), as well as a drying cycle. A pre-wash cycle may also be included as part of the wet cycle, and may be automatic or an option for particularly soiled dishes.

Presently, many known dishwasher appliances utilize venting arrangements to vent moist air during the drying cycle, in order to facilitate drying. New air is drawn into the dishwasher appliance as the moist air is vented from the dishwasher appliance. Such approach, however, can be problematic. For example, venting the moist air during the drying cycle can add moisture and heat to the surrounding environment, such as the kitchen or other room where the dishwasher appliance is located. Additionally, the air drawn into the dishwasher appliance from the surrounding environment can, in some cases, potentially be dirty or include undesirable particles, etc.

More recently, attempts have been made to recirculate air within the dishwasher appliances in order to reduce or avoid the above discussed disadvantages, and to generally recover the associated energy. For example, adsorbent assemblies have been utilized in dishwasher appliances in attempts to remove moisture during operation. However, such adsorbent assemblies utilize additional heaters contained within the adsorbent assemblies to directly heat adsorbent materials and facilitate desorption, also known as regeneration. Such approach is generally inefficient.

Accordingly, improved dishwasher appliances are desired in the art. In particular, dishwasher appliances which provide improved air recirculation and energy recovery during operation would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a dishwasher appliance is provided. The dishwasher appliance includes a tub defining a chamber for the receipt of articles for cleaning, a sump for collecting liquid from the chamber, a fluid circulation conduit for circulating liquid in the tub, and a first pump downstream of and in fluid communication with the sump. The dishwasher appliance further includes an adsorption assembly, the adsorption assembly including a desiccant module and an adsorption conduit extending through the desiccant module. The dishwasher appliance further includes a second pump downstream of and in fluid communication with the adsorption conduit, the second pump further upstream of the sump. The dishwasher appliance further includes a first heater spaced from the adsorption assembly, the first heater operable to heat liquid flowed therethrough from the first pump.

In accordance with another embodiment of the present disclosure, a dishwasher appliance is provided. The dishwasher appliance includes a tub defining a chamber for the receipt of articles for cleaning, a sump for collecting liquid from the chamber, a fluid circulation conduit for circulating liquid in the tub, and a first pump downstream of and in fluid communication with the sump, wherein the fluid circulation conduit is downstream of and in fluid communication with the first pump. The dishwasher appliance further includes an adsorption assembly, the adsorption assembly including a desiccant module and an adsorption conduit extending through the desiccant module, and a second pump downstream of and in fluid communication with the adsorption conduit, the second pump further upstream of the sump. The dishwasher appliance further includes a first heater spaced from the adsorption assembly, the first heater operable to heat liquid flowed therethrough from the first pump, and a second heater spaced from the adsorption assembly, the second heater operable to heat liquid flowed therethrough from the second pump. The dishwasher appliance further includes a valve operable to selectively supply liquid from the second pump to the sump and to the adsorption conduit.

In accordance with another embodiment of the present disclosure, a dishwasher appliance is provided. The dishwasher appliance includes a tub defining a chamber for the receipt of articles for cleaning, a sump for collecting liquid from the chamber, a fluid circulation conduit for circulating liquid in the tub, and a first pump downstream of and in fluid communication with the sump. The dishwasher appliance further includes an adsorption assembly, the adsorption assembly including a desiccant module and an adsorption conduit extending through the desiccant module. The dishwasher appliance further includes a second pump downstream of and in fluid communication with the adsorption conduit, the second pump further upstream of the sump, and a first heater spaced from the adsorption assembly, the first heater operable to heat liquid flowed therethrough from the first pump or the second pump. The dishwasher appliance further includes a first valve operable to selectively supply liquid from the first pump through the first heater and to the fluid circulation conduit, a second valve operable to selectively supply liquid from the second pump to the sump and to the first heater, a third valve operable to selectively supply liquid flowed through the heater to the fluid circulation conduit and to the adsorption conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
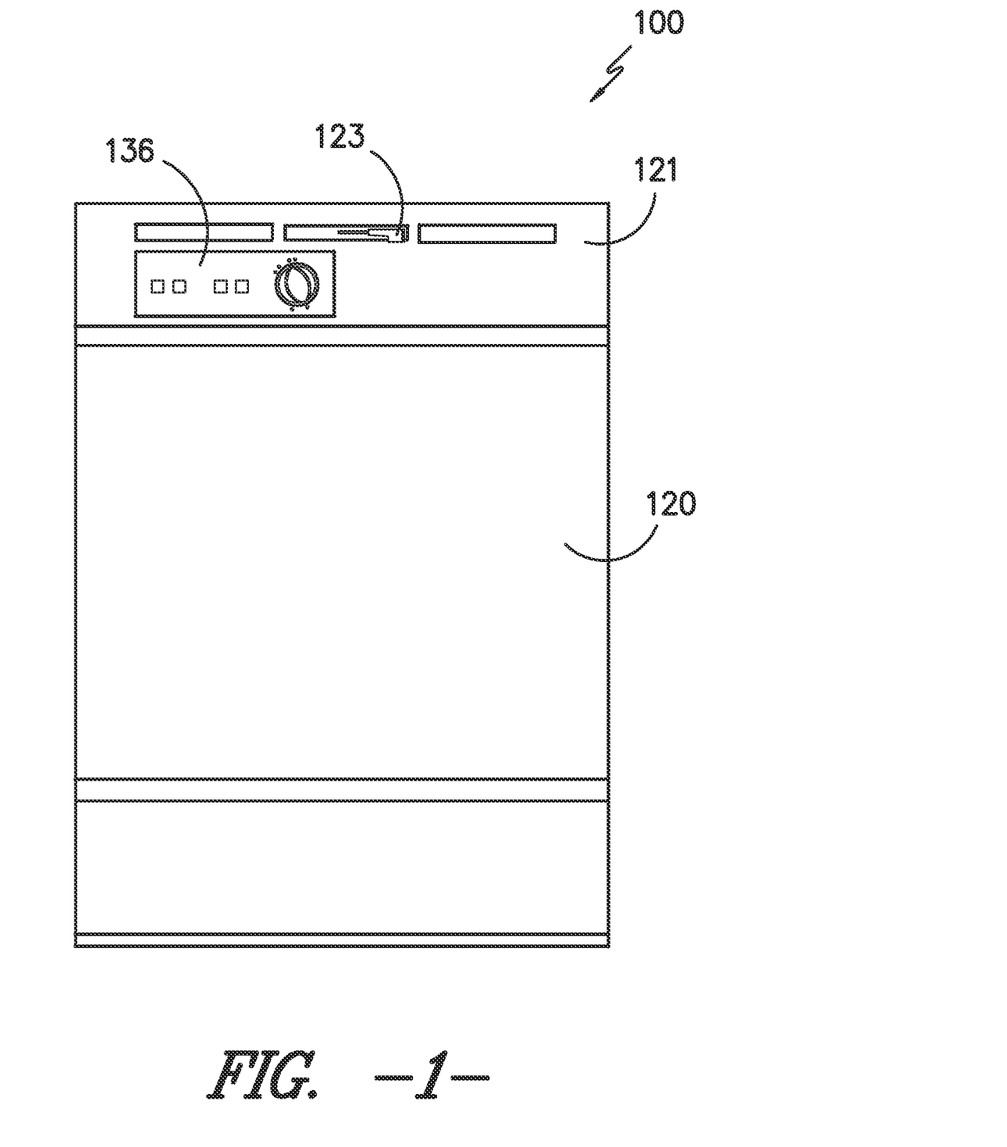
FIG. 1 provides a front, perspective view of a dishwasher appliance in accordance with one embodiment of the present disclosure.
Figure 2:
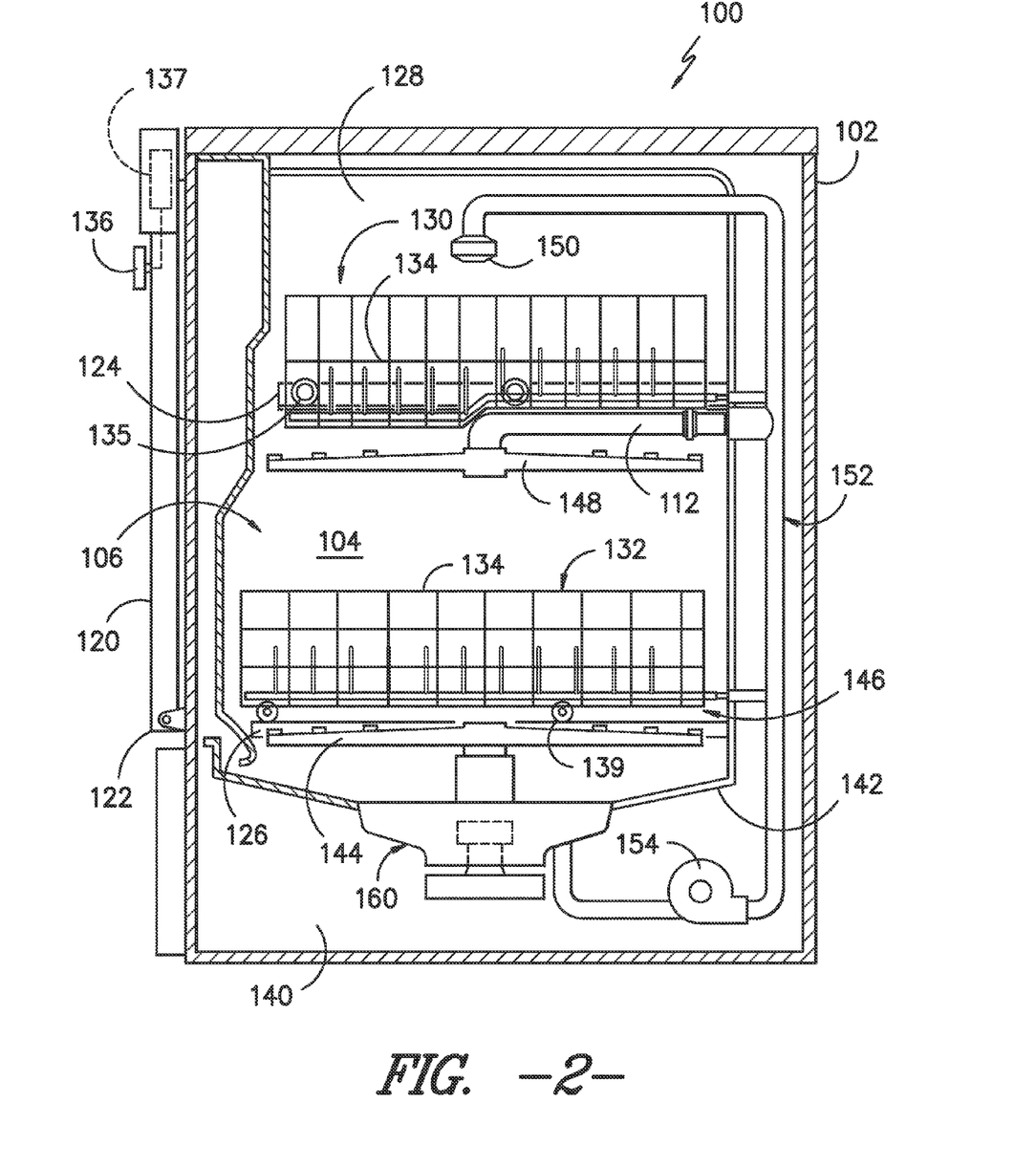
FIG. 2 provides a side, cross-sectional view of a dishwasher appliance in accordance with one embodiment of the present disclosure.

FIGS. 1 and 2 depict an exemplary domestic dishwasher appliance 100 that may be configured in accordance with aspects of the present disclosure. For the particular embodiment of FIG. 1, the dishwasher appliance 100 includes a cabinet 102 having a tub 104 therein that defines a wash chamber 106. Chamber 106 is configured for the receipt of articles for cleaning, such as dishes, cups, utensils, etc. The tub 104 includes a front opening (not shown) and a door 120 hinged at or near its bottom side wall 122 for movement between a normally closed vertical position (shown in FIGS. 1 and 2), wherein the wash chamber 106 is sealed shut for washing operation, and a horizontal open position for loading and unloading of articles from the dishwasher appliance 100. Latch 123 is used to lock and unlock door 120 for access to chamber 106.

Upper and lower guide rails 124, 126 are mounted on tub side walls 128 and accommodate roller-equipped rack assemblies 130 and 132. Each of the rack assemblies 130, 132 may be fabricated into lattice structures including a plurality of elongated members 134 (for clarity of illustration, not all elongated members making up assemblies 130 and 132 are shown in FIG. 2). Each rack 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 135 and 139, for example, mounted onto racks 130 and 132, respectively. A silverware basket (not shown) may be removably attached to rack assembly 132 for placement of silverware, utensils, and the like, that are otherwise too small to be accommodated by the racks 130, 132.

The dishwasher appliance 100 further includes a lower spray-arm assembly 144 that is rotatably mounted within a lower region 146 of the wash chamber 106 and above a tub sump portion 142 so as to rotate in relatively close proximity to rack assembly 132. A mid-level spray-arm assembly 148 is located in an upper region of the wash chamber 106 and may be located in close proximity to upper rack 130. Additionally, an upper spray assembly 150 may be located above the upper rack 130.

The lower and mid-level spray-arm assemblies 144, 148 and the upper spray assembly 150 are fed by a fluid circulation conduit 152 for circulating water and dishwasher fluid (generally referred to as liquid) in the tub 104. A first pump 154, which may for example be located in a machinery compartment 140 located below the bottom sump portion 142 of the tub 104, may flow liquid to and through the fluid circulation conduit 152. Each spray-arm assembly 144, 148 includes an arrangement of discharge ports or orifices for directing washing liquid onto dishes or other articles located in rack assemblies 130 and 132. The arrangement of the discharge ports in spray-arm assemblies 144, 148 provides a rotational force by virtue of washing fluid flowing through the discharge ports. The resultant rotation of the lower spray-arm assembly 144 provides coverage of dishes and other dishwasher contents with a washing spray.

The dishwasher 100 is further equipped with a controller 137 to regulate operation of the dishwasher 100. The controller may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher 100. In the illustrated embodiment, the controller 137 may be located within a control panel area 121 of door 120 as shown. In such an embodiment, input/output ("I/O") signals may be routed between the control system and various operational components of dishwasher 100 along wiring harnesses that may be routed through the bottom side wall 122 of door 120. Typically, the controller 137 includes a user interface panel 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

In general, dishwasher appliance 100 may utilize a variety of cycles to wash and, optionally, dry articles within chamber 106. For example, a wet cycle is utilized to wash articles. The wet cycle may include a main wash cycle and a rinse cycle, as well as an optional pre-wash cycle. During each such cycle, water or another suitable liquid may be utilized in chamber 106 to interact with and clean articles therein. Such liquid may, for example, be directed into chamber 106 from lower and mid-level spray-arm assemblies 144, 148 and the upper spray assembly 150. The liquid may additionally mix with, for example, detergent or other various additives which are released into the chamber during various sub-cycles of the wet cycle. A drying cycle may be utilized to dry articles after washing. During a drying cycle, for example, a heating element (not shown) may heat the chamber 106 to facilitate drying of the articles and evaporation of liquid into gas within the chamber 106. In generally, no liquid is sprayed or otherwise produced during the drying cycle.

It should be appreciated that the invention is not limited to any particular style, model, or other configuration of dishwasher, and that the embodiment depicted in FIGS. 1 and 2 is for illustrative purposes only. For example, instead of the racks 130, 132 depicted in FIG. 1, the dishwasher 100 may be of a known configuration that utilizes drawers that pull out from the cabinet and are accessible from the top for loading and unloading of articles. Other configurations may be used as well.

Figure 3:
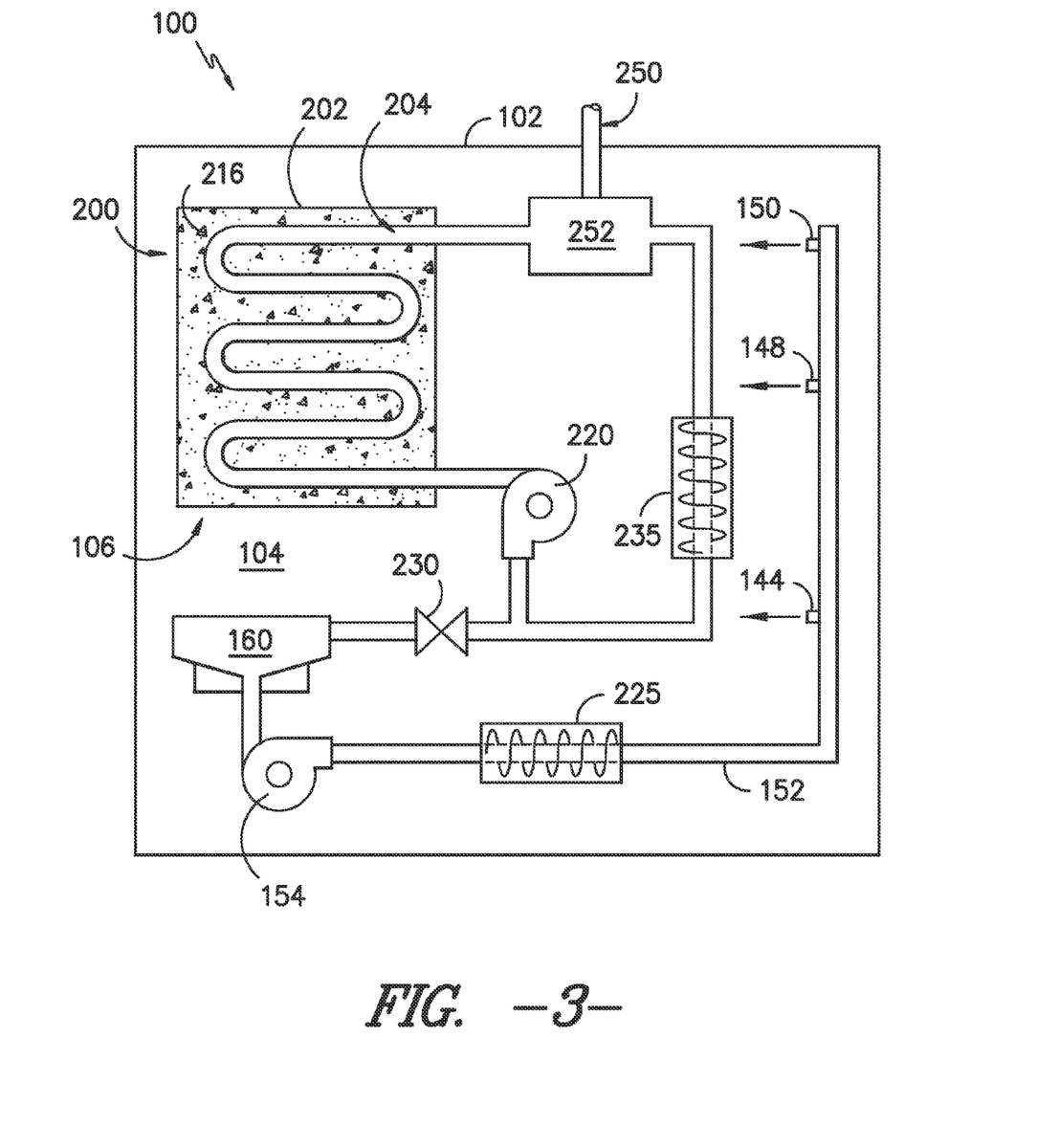
FIG. 3 provides a side schematic view of various components of a dishwasher appliance in accordance with one embodiment of the present disclosure.
Figure 4:
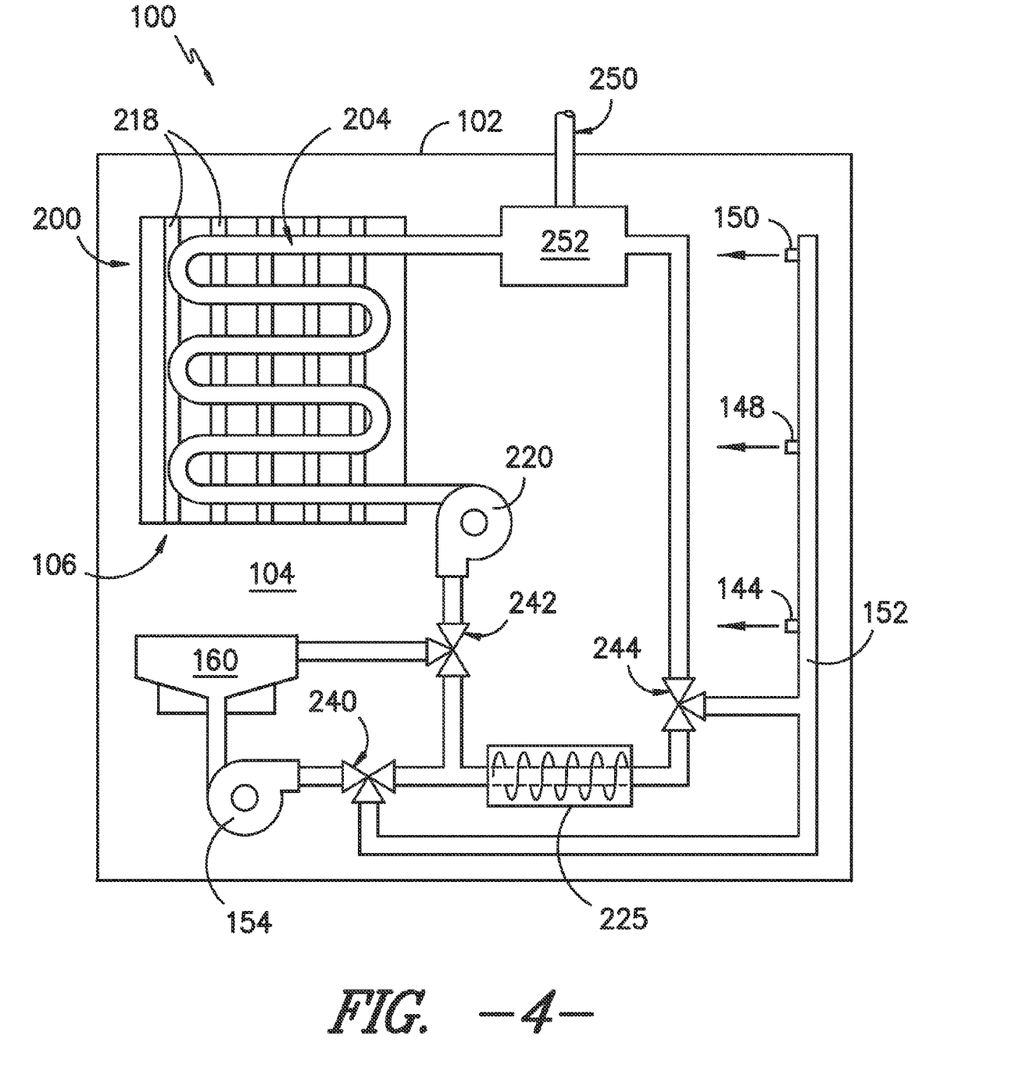
FIG. 4 provides a side schematic view of various components of a dishwasher appliance in accordance with another embodiment of the present disclosure.
Figure 5:
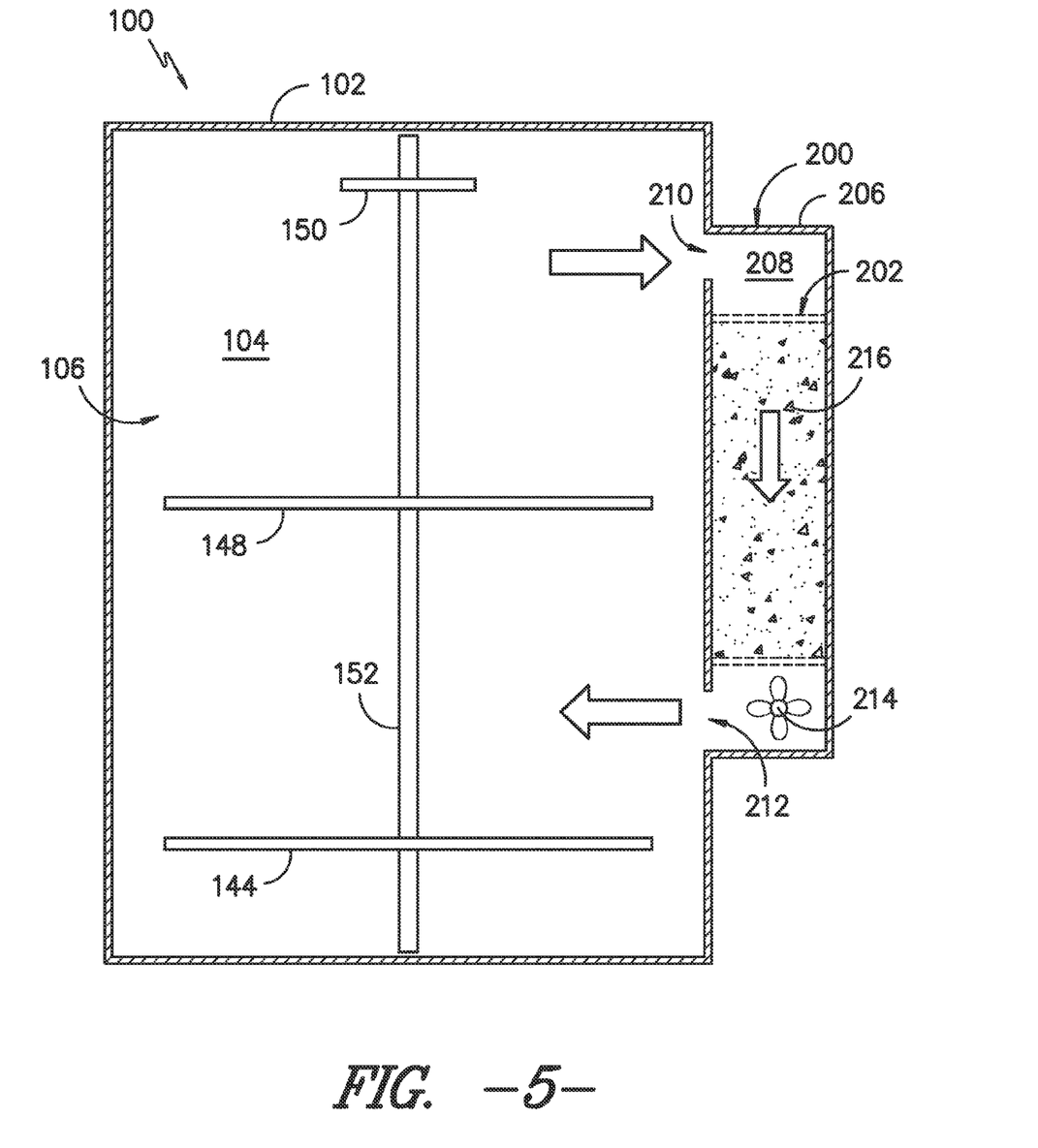
FIG. 5 provides a front schematic view of various components of a dishwasher appliance in accordance with one embodiment of the present disclosure.

Referring now to FIGS. 3 through 5, dishwasher appliances 100 according to the present disclosure may further include various components which facilitate improved air recirculation and energy recovery during operation of the appliance 100. In particular, dishwasher appliances 100 may utilize desiccants to adsorb moisture, in particular during the drying cycle, and desorb such moisture during the wet cycle. Such adsorption and desorption may reduce or eliminate the need to vent air from the dishwasher appliance 100 during operation. Further, desorption may facilitate liquid heating within the dishwasher appliance 100, thus providing improved efficiency by causing the dishwasher appliance 100 to require less heating As illustrated, a dishwasher appliance 100 may include a sump 160, which is generally located in sump portion 142 of the tub 104. The sump 160 generally collects liquid from the chamber 106. Further, such liquid may be flowed from the sump 160 to the first pump 154. Accordingly, the first pump 154 may generally be downstream of and in fluid communication with the sump 160.

Dishwasher appliance 100 further generally includes an adsorption assembly 200. Adsorption assembly 200 may include a desiccant module 202 and an adsorption conduit 204 extending through the desiccant module 202. In general, the adsorption assembly 200 may be in fluid communication with the chamber 106, such that gas, in particular moist and/or humid gas, within the chamber 106 can be adsorbed desiccant in the desiccant module, and such that the gas can further be desorbed and recirculated into the chamber 106. For example, as illustrated in FIG. 5, the desiccant module 202 may include a housing 206 that defines a chamber 208 therein. Housing 206 may be connected to (as illustrated) or disposed within chamber 106. Further, module 202 may include an inlet 210 and an outlet 212 defined in the housing 206, which may provide the fluid communication between the chamber 208 and the chamber 106. Desiccant and a portion of the adsorption conduit 204 may be disposed within the chamber 208.

Additionally, as illustrated in FIGS. 3 through 5, in some embodiments, adsorption assembly 200 may include a fan 214. Fan 214 may facilitate the flow of gas into and through the module 202, such as through the chamber 208 thereof. For example, in some embodiments, fan 214 may be disposed within chamber 208 proximate the outlet 212. Fan 212 may be operable to actively flow gas into chamber 208 through the inlet 210 and out of chamber 208 through outlet 212.

In some embodiments, the desiccant module 202 may include a granular desiccant 216, as illustrated in FIG. 3. Such desiccant 216 in granular form may generally surround the adsorption conduit 204. In exemplary embodiments, the granular desiccant 212 may be zeolite. Alternatively, however, the desiccant may be activated charcoal, calcium sulfate, calcium chloride, or another suitable molecular sieve, or any other suitable material, etc. In alternative embodiments, the desiccant module 202 may include a plurality of desiccant-coated plates 218, as illustrated in FIG. 4. Each plate 218 may be positioned adjacent to, and may in exemplary embodiments be fastened to or otherwise in contact with the adsorption conduit 204. In exemplary embodiments, the desiccant coating the plates may be zeolite. Alternatively, however, the desiccant may be activated charcoal, calcium sulfate, calcium chloride, or another suitable molecular sieve, or any other suitable material, etc. The plates themselves may be formed from any suitable material, such as a suitable metal, polymer, ceramic, etc.

The adsorption conduit 204 may generally flow a liquid therethrough, as discussed herein, and through the adsorption assembly 200. Because the adsorption conduit 204 extends through the desiccant module 202 and is adjacent to or in contact with the desiccant in the module 202, indirect heat exchange may advantageously occur between liquid in and flowing through the adsorption conduit 204 and the desiccant, such as the granular desiccant 216 or the desiccant-coated plates 218. Such indirect heat exchange may, for example, heat the liquid or facilitate heating and resulting regeneration of the desiccant as desired.

Referring again to FIGS. 3 and 4, a dishwasher appliance 100 according to the present disclosure may include a second pump 220. The second pump 220 may be disposed downstream of and in fluid communication with the adsorption conduit 204, such that liquid within the conduit 204 is flowed from conduit 204 through the second pump 220. As illustrated, second pump 220 is further generally downstream of the adsorption assembly 200 generally, including the desiccant module 202. Additionally, in exemplary embodiments as illustrated, the second pump 220 is disposed upstream of the sump 160 as well as the first pump 154.

It should be noted that the terms "upstream" and "downstream" as utilized herein generally refer to the positioning of components relative to the flow of fluid through the respective components. Thus, the positioning of a component "upstream" or "downstream" of another component refers only to the relative positioning in a flow path that actually proceeds through both components. The use of additional flow paths, such as flow paths which utilized one of the relative components by bypass the other of the relative components, are considered outside of the scope of the use of such terms.

Dishwasher appliance 100 additionally includes a first heater 225. The first heater 225 is spaced from the adsorption assembly 200. Accordingly, the first heater 225 is not housed within the desiccant module 202 or otherwise in contact with the adsorption assembly 200. As illustrated, the first heater 225 is generally operable to heat liquid flowed therethrough from the first pump 154. Accordingly, first heater 225 may be disposed downstream of the first pump 154.

Dishwasher appliance 100 may additionally include various other components for flowing liquid therethrough and facilitating adsorption and desorption within the adsorption assembly 200. For example, referring now to FIG. 3, dishwasher appliance 100 may include valve 230. Valve 230 may be operable to selectively supply liquid from the second pump 220 to the sump 160 and to the adsorption conduit 204. In other words, valve 230 may alternately be positioned such that liquid is allowed to flow from the second pump 220 to the sump 160 or from the second pump 220 to the adsorption conduit 204. In exemplary embodiments, valve 230 is a two-way valve which allows such selective, alternative positioning (an open position for flow to the sump 160 as illustrated or alternatively to the adsorption conduit 204, and a closed position for flow to the adsorption conduit 204 as illustrated or alternatively to the sump 160). Liquid may thus flow from second pump 220 to either the sump 160 or the adsorption conduit 204, based on the positioning of the valve 230, as illustrated.

Still referring to FIG. 3, dishwasher appliance 100 may further include a second heater 235. The second heater 235 may, similar to the first heater 225, be spaced from the adsorption assembly 200. Further, the second heater 235 may be operable to heat liquid flowed therethrough from the second pump 220. Accordingly, the second heater may be disposed downstream of the second pump 220, and in exemplary embodiments between the second pump 220 and the adsorption conduit 204.

Further, in exemplary embodiments, the fluid circulation conduit 152 may be downstream of and in fluid communication with the first pump 154. First heater 225 may be disposed between the first pump 154 and fluid circulation conduit 152, as illustrated.

Controller 137 may be in operable communication with the various components of the dishwasher appliance 100 as illustrated in FIG. 3, such as the first pump 154, second pump 220, first heater 225, second heater 235 and valve 230, and may be operable to adjust the dishwasher appliance 100 (and thus the various components) to various settings based on desired operation of the dishwasher appliance and desired adsorption or regeneration/desorption of the desiccant. For example, the controller 137 may be operable to adjust the dishwasher appliance 100 to a desorption setting wherein the first pump 154 and the second pump 220 are on and the valve 230 is positioned such that fluid flows from the second pump 220 to the adsorption conduit 204. Such setting may for example be an initial setting of the dishwasher appliance 100 when a wet cycle is initiated, during an initial wash and fill within the chamber 100. In this setting, liquid is recirculated through the adsorption conduit. The relatively higher temperature of the liquid within the adsorption conduit 204 may facilitate regeneration and desorption of the desiccant, which may in turn mix with and heat liquid generally within the chamber 106. First heater 225 (which may be in operable communication with the controller 137) may remain off in this setting, while second heater 235 may be operated on or off as desired by controller 137 to obtain a desired liquid temperature within the adsorption conduit 204.

The controller 137 may further be operable to adjust the dishwasher appliance 100 to a hot wash setting wherein the first pump 154 is on, the second pump 220 is off, and the valve 230 is positioned such that the fluid flows from the second pump 220 to the sump 160. Such setting may for example be a subsequent setting of the dishwasher appliance 100 (after the desorption setting) when a wet cycle is initiated, and may be the setting for the majority of the wet cycle. In this setting, liquid is flowed from the adsorption conduit 204 through the sump 160 to the fluid circulation conduit 152 and thus into the chamber 106 to wash articles therein. Second heater 235 may remain off in this setting, while first heater 225 may be operated on or off as desired by controller 137 to obtain a desired liquid temperature generally within the chamber 106.

The controller 137 may further be operable to adjust the dishwasher appliance 100 to an adsorption setting wherein the first pump 154, the second pump 220, the first heater 225, and the second heater 235 are off. Such setting may for example be the setting during the drying cycle of the dishwasher appliance 100. In this setting, moisture/humidity may be adsorbed by the desiccant.

Notably, fan 214 may additionally be in operable communication with the controller 137. The controller 137 may operate the fan 214 in the desorption setting and the adsorption setting, and may not operate the fan 214 in the hot wash setting.

Referring now to FIG. 4, a second embodiment of a dishwasher appliance 100 according to the present disclosure is illustrated. In this embodiment, no second heater 235 or additional heat source aside from the first heater 225 is required. Thus, first heater 225 is the sole heat source for the dishwasher appliance 100. The first heater 225 may be operable to heat liquid flowed therethrough from the first pump 154 and/or the second pump 220. Such embodiment may utilize a variety of valves to facilitate the flows and settings that are desired. For example, dishwasher appliance 100 may include a first valve 240. The first valve 240 may be operable to selectively supply liquid from the first pump 154 through the first heater 225 and to the fluid circulation conduit 152. In other words, valve 240 may alternately be positioned such that liquid is allowed to flow from the first pump 154 through the first heater 225 or from the first pump 154 to the fluid circulation conduit 152. In exemplary embodiments, valve 240 is a three-way valve, such as a three-two valve, which allows such selective, alternative positioning. Liquid may thus flow from first pump 154 through the valve 240 to either the first heater 225 or the fluid circulation conduit 152, based on the positioning of the valve 240, as illustrated.

Dishwasher appliance 100 may further include a second valve 242. The second valve 242 may be operable to selectively supply liquid from the second pump 220 to the sump 160 and through the first heater 225. In other words, valve 242 may alternatively be positioned such that liquid is allowed to flow from the second pump 220 to the sump 160 or from the second pump 220 through the first heater 225. In exemplary embodiments, valve 242 is a three-way valve, such as a three-two valve, which allows such selective, alternative positioning. Liquid may thus flow from second pump 220 through the valve 242 to either the sump 160 or to the first heater 225, based on the positioning of the valve 242, as illustrated.

Dishwasher appliance 100 may further include a third valve 244. The third valve 244 may be operable to selectively supply fluid flowed through the first heater 225 to the fluid circulation conduit 152 and to the adsorption conduit 204. In other words, valve 244 may alternatively be positioned such that liquid is allowed to flow from the first heater 225 to the fluid circulation conduit 152 or from the first heater 225 to the adsorption conduit 204. In exemplary embodiments, valve 244 is a three-way valve, such as a three-two valve, which allows such selective, alternative positioning. Liquid may thus flow from first heater 225 through the valve 244 to either the fluid circulation conduit 152 or to the adsorption conduit 204, based on the positioning of the valve 244, as illustrated.

Controller 137 may be in operable communication with the various components of the dishwasher appliance 100 as illustrated in FIG. 4, such as the first pump 154, second pump 220, first heater 225, and valves 240, 242, 244, and may be operable to adjust the dishwasher appliance 100 (and thus the various components) to various settings based on desired operation of the dishwasher appliance and desired adsorption or regeneration/desorption of the desiccant. For example, the controller 137 may be operable to adjust the dishwasher appliance 100 to a desorption setting wherein the first pump 154 and the second pump 220 are on, the first valve 240 is positioned such that fluid flows from the first pump 154 to the fluid circulation conduit 152, the second valve 242 is positioned such that fluid flows from the second pump 220 to the first heater 225, and the third valve 244 is positioned such that fluid flows through the first heater 225 to the adsorption conduit 204. Such setting may for example be an initial setting of the dishwasher appliance 100 when a wet cycle is initiated, during an initial wash and fill within the chamber 100. In this setting, liquid is recirculated through the adsorption conduit 204. The relatively higher temperature of the liquid within the adsorption conduit 204 may facilitate regeneration and desorption of the desiccant, which may in turn mix with and heat liquid generally within the chamber 106. First heater 225 (which may be in operable communication with the controller 137) may be operated on or off as desired by controller 137 to obtain a desired liquid temperature within the adsorption conduit 204.

The controller 137 may further be operable to adjust the dishwasher appliance 100 to a hot wash setting wherein the first pump 154 is on, the second pump 220 is off, the first valve 240 is positioned such that fluid flows from the first pump 154 through the first heater 225, the second valve 242 is positioned such that fluid flows from the second pump 220 to the sump 160, and the third valve 244 is positioned such that fluid flows through the first heater 225 to the fluid circulation conduit 152. Such setting may for example be a subsequent setting of the dishwasher appliance 100 (after the desorption setting) when a wet cycle is initiated, and may be the setting for the majority of the wet cycle. In this setting, liquid is flowed to the fluid circulation conduit 152 and thus into the chamber 106 to wash articles therein. First heater 225 may be operated on or off as desired by controller 137 to obtain a desired liquid temperature generally within the chamber 106.

The controller 137 may further be operable to adjust the dishwasher appliance 100 to an adsorption setting wherein the first pump 154, the second pump 220, and the first heater 225 are off. Such setting may for example be the setting during the drying cycle of the dishwasher appliance 100. In this setting, moisture/humidity may be adsorbed by the desiccant.

Notably, fan 214 may additionally be in operable communication with the controller 137. The controller 137 may operate the fan 214 in the desorption setting and the adsorption setting, and may not operate the fan 214 in the hot wash setting.

Referring again to FIGS. 3 and 4, dishwasher appliance 100 further includes a supply conduit 250. The supply conduit 250 generally supplies liquid to the chamber 106, such as via the adsorption conduit 204, etc. The supply conduit 250 may thus be in fluid communication with the adsorption conduit 204. Dishwasher appliance 100 may further in some embodiments include a fill chamber 252. Fill chamber 252 may be disposed between the adsorption conduit 204 and the supply conduit 250, and may hold liquid supplied from the supply conduit 250 and flow such liquid to the adsorption conduit 204 as desired. Further, liquid flowed within the dishwasher appliance 100 to the adsorption conduit 204 may in exemplary embodiments flow through the fill chamber 252. Fill chamber 252 may thus be upstream of the adsorption conduit 204 and downstream of the various components that may supply liquid to the adsorption conduit 204. The fill chamber 252 may be utilized to recover residual heat from the adsorption assembly 200 during filling of the tub 104 with liquid, such as during portions of the wet cycle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwasher appliance, comprising:
    a tub defining a chamber for the receipt of articles for cleaning;
    a sump for collecting liquid from the chamber;
    a fluid circulation conduit for circulating liquid in the tub;
    a first pump downstream of and in fluid communication with the sump;
    an adsorption assembly, the adsorption assembly comprising a desiccant module and an adsorption conduit extending through the desiccant module;
    a second pump downstream of and in fluid communication with the adsorption conduit, the second pump further upstream of the sump,
    a first heater spaced from the adsorption assembly, the first heater operable to heat liquid flowed therethrough from the first pump; and
    a valve operable to selectively supply liquid from the second pump to the sump and to the adsorption conduit.

2. The dishwasher appliance of claim 1, further comprising a second heater, the second heater operable to heat liquid flowed therethrough from the second pump.

3. The dishwasher appliance of claim 1, wherein the fluid circulation conduit is downstream of and in fluid communication with the first pump.

4. The dishwasher appliance of claim 1, further comprising a supply conduit for supplying liquid to the chamber, the supply conduit in fluid communication with the adsorption conduit.

5. The dishwasher appliance of claim 4, further comprising a fill chamber, the fill chamber disposed between the adsorption conduit and the supply conduit for holding liquid supplied from the supply conduit and flowing liquid to the adsorption conduit.

6. The dishwasher appliance of claim 1, wherein the desiccant module comprises a granular desiccant, the granular desiccant generally surrounding the adsorption conduit.

7. The dishwasher appliance of claim 6, wherein the desiccant is zeolite.

8. The dishwasher appliance of claim 1, wherein the desiccant module comprises a plurality of desiccant-coated plates, the plates adjacent to the adsorption conduit.

9. The dishwasher appliance of claim 8, wherein the desiccant is zeolite.

10. The dishwasher appliance of claim 1, wherein the desiccant module defines an inlet and an outlet each in fluid communication with the chamber.

11. The dishwasher appliance of claim 1, wherein the adsorption assembly further comprises a fan.

12. A dishwasher appliance, comprising:
    a tub defining a chamber for the receipt of articles for cleaning;
    a sump for collecting liquid from the chamber;
    a fluid circulation conduit for circulating liquid in the tub;
    a first pump downstream of and in fluid communication with the sump, wherein the fluid circulation conduit is downstream of and in fluid communication with the first pump;
    an adsorption assembly, the adsorption assembly comprising a desiccant module and an adsorption conduit extending through the desiccant module;
    a second pump downstream of and in fluid communication with the adsorption conduit, the second pump further upstream of the sump;

a first heater spaced from the adsorption assembly, the first heater operable to heat liquid flowed therethrough from the first pump;

a second heater spaced from the adsorption assembly, the second heater operable to heat liquid flowed therethrough from the second pump;

a valve operable to selectively supply liquid from the second pump to the sump and to the adsorption conduit.

13. The dishwasher appliance of claim 12, further comprising a controller, the controller in operable communication with the first pump, the second pump, the first heater, the second heater, and the valve, the controller operable to:

adjust the dishwasher appliance to a desorption setting wherein the first pump and the second pump are on and the valve is positioned such that liquid flows from the second pump to the adsorption conduit;

adjust the dishwasher appliance to a hot wash setting wherein the first pump is on, the second pump is off, and the valve is positioned such that the liquid flows from the second pump to the sump; and adjust the dishwasher appliance to an adsorption setting wherein the first pump, the second pump, the first heater, and the second heater are off.

14. A dishwasher appliance, comprising:
a tub defining a chamber for the receipt of articles for cleaning;
a sump for collecting liquid from the chamber;
a fluid circulation conduit for circulating liquid in the tub;
a first pump downstream of and in fluid communication with the sump;
an adsorption assembly, the adsorption assembly comprising a desiccant module and an adsorption conduit extending through the desiccant module;
a second pump downstream of and in fluid communication with the adsorption conduit, the second pump further upstream of the sump;
a first heater spaced from the adsorption assembly, the first heater operable to heat liquid flowed therethrough from the first pump or the second pump;
a first valve operable to selectively supply liquid from the first pump through the first heater and to the fluid circulation conduit;
a second valve operable to selectively supply liquid from the second pump to the sump and to the first heater; and
a third valve operable to selectively supply liquid flowed through the heater to the fluid circulation conduit and to the adsorption conduit.

15. The dishwasher appliance of claim 14, further comprising a controller, the controller in operable communication with the first pump, the second pump, the first heater, the first valve, the second valve, and the third valve, the controller operable to:

adjust the dishwasher appliance to a desorption setting wherein the first pump and the second pump are on, the first valve is positioned such that liquid flows from the first pump to the fluid circulation conduit, the second valve is positioned such that liquid flows from the second pump to the first heater, and the third valve is positioned such that liquid flows through the first heater to the adsorption conduit;

adjust the dishwasher appliance to a hot wash setting wherein the first pump is on, the second pump is off, the first valve is positioned such that liquid flows from the first pump through the first heater, the second valve is positioned such that liquid flows from the second pump to the sump, and the third valve is positioned such that liquid flows through the first heater to the fluid circulation conduit; and adjust the dishwasher appliance to an adsorption setting wherein the first pump, the second pump, and the first heater are off.

16. The dishwasher appliance of claim 14, wherein the first heater is the sole heat source for the dishwasher appliance.

* * * * *